E. T. GREENFIELD.
HOSE.
APPLICATION FILED MAY 2, 1908.
1,001,842.
Patented Aug. 29, 1911.
2 SHEETS—SHEET 1.
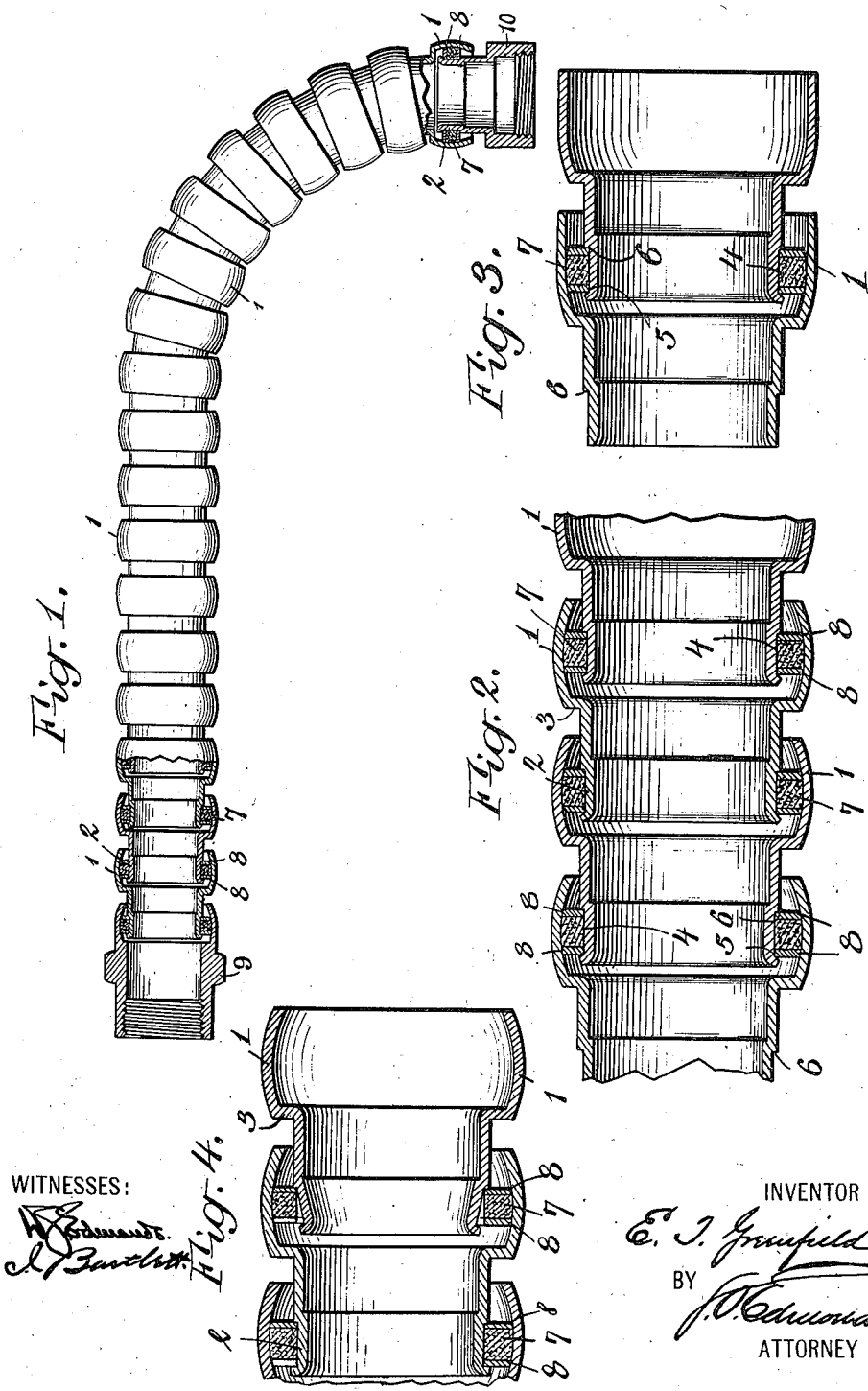
WITNESSES:
INVENTOR
BY
ATTORNEY E. T. GREENFIELD.
HOSE.
APPLICATION FILED MAY 2, 1908.
1,001,842.
Patented Aug. 29, 1911.
2 SHEETS—SHEET 2.
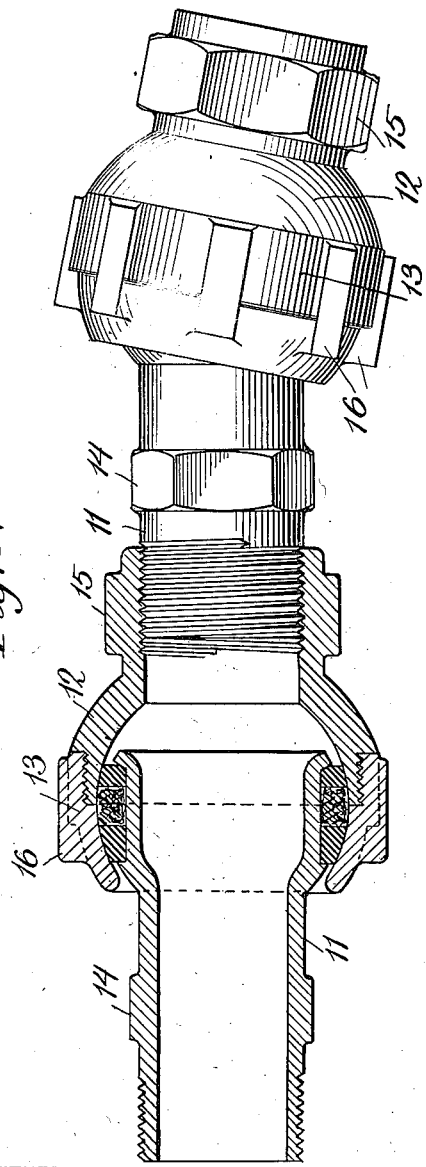
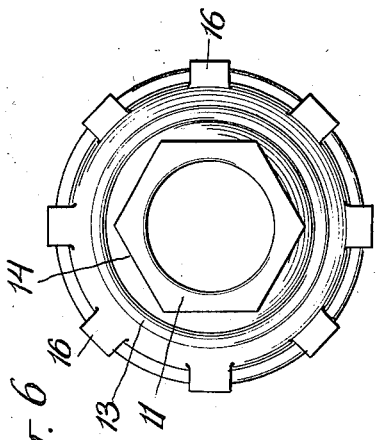

UNITED STATES PATENT OFFICE.

EDWIN T. GREENFIELD, OF KIAMESHA, NEW YORK.

HOSE.

1,001,842. Specification of Letters Patent. Patented Aug. 29, 1911.

Application filed May 2, 1908. Serial No. 430,493.

*To all whom it may concern:*

Be it known that I, EDWIN T. GREENFIELD, a citizen of the United States, residing at Kiamesha, in the county of Sullivan and State of New York, have invented certain new and useful Improvements in Hose, of which the following is a specification.

This invention relates to flexible metallic hose adapted for such uses as carrying steam and air under pressure.

While the hose constructed in accordance with the invention is susceptible of use in various ways, it is of particular utility in making connection between the steam and air pipes of the cars of a railway train. For this purpose, the hose must possess sufficient strength to withstand considerable pressure and yet it must be readily flexible to allow for the relative movements of the cars.

The preferred embodiment of the invention is illustrated in the accompanying drawings in which—

Figure 1 is a view of the hose partly in section and partly in elevation, Fig. 2 is an enlarged section of a piece of the hose, Figs. 3 and 4 are sectional views showing the hose in process of construction, and Figs. 5 and 6 are a sectional elevation and an end view, respectively, illustrating a modification.

Referring to these drawings, the hose consists of a plurality of tubular pieces, each of which has one end extending within the end of the next adjacent piece and movable relatively to but interlocked with that piece. Each of the tubular pieces has a portion 1 at one end which is of larger diameter than the portion 2 at the other end, the two parts of different diameters being connected by a wall 3 disposed transversely to the axis of the tubular piece. In the portion 2 of smaller diameter is a shallow circumferential groove 4 formed by shaping the metal of the portion 2 to extend in a direction transverse to the axis of the piece to form the side walls of the groove at 5 and 6. The portion 1 is convexly curved as shown, the center about which the curve is described being in the axis of the tubular piece.

The smaller portion 2 of each tubular piece fits within the larger portion 1 of the next adjacent piece and between these two is a gasket 7 of any suitable compressible material and on either side thereof, a ring 8 of thin sheet-metal. The thickness of the gasket and the two rings 8 is the same as the width of the groove in the portion 2 so that the walls 5 and 6 retain the gasket and rings in proper relative position. The rings 8 are of such size and their outer edges are so shaped that they fit snugly between the portions 1 and 2 of adjacent pieces and, with the gasket 7, effectually prevent the escape of the fluid carried by the hose even though the fluid be under considerable pressure.

In the manufacture of the hose, the tubular pieces may be shaped as above described except that the curve of the portion 1 is but half formed. A pair of pieces are then assembled with the gasket 7 and rings 8 between them, as shown in Fig. 3, and then the end of the portion 1 is curved over to partially inclose the gasket and rings and complete the convex curvature of the portion 1. The ends of a length of the hose may be finished off in any suitable manner, depending on the use to which the hose is to be put. Thus in Fig. 1, I have shown end-pieces 9 and 10, each having one end formed to correspond with one end of the tubular pieces and the other threaded or otherwise formed to coact with the part to which the hose is to be attached. A method of constructing the hose which I prefer to employ, however, involves expanding the underlapping end of each tubular piece when it and the next adjacent piece are in proper position, the curvature of the overlapping ends being completed in making the pieces as the curve can then be more accurately formed. Thus in Fig. 4 the underlapping end 2 of a piece is shown as tapered so that it may be inserted within the overlapping end 1 of the next piece. In this case the rings 8 of the gasket may be split to permit of readily inserting them within the end 1. With the parts assembled as shown in Fig. 4, a suitable tool is inserted within the contracted end 2 and that end is expanded until the gasket is properly seated in its groove 4 and completely fills the space between the portion 2 of one piece and the portion 1 of the next piece.

The hose thus constructed possesses to a marked degree the two requisites of a hose of this type, namely, flexibility to permit it to be bent readily in any direction, and strength to resist pressure from within and prevent leakage of the fluid agent carried by the hose. The flexure is obtained by the movement of each piece relatively to the pieces adjacent thereto, each gasket 7 sliding on the under surface of the convex portion 1 overlying it. The gasket 7 is retained in position by the walls 5 and 6, it being practically riveted upon the portion 2 and the rings at the sides thereof retain the gasket in proper position by preventing it from flattening out; in fact, the pressure upon the inner ring 8 tends to expand the gasket in a radial direction so as to press it into contact with the curved surface of the tubular piece so that the space between the two pieces is completely filled and the gasket, while sliding on the curved surface, effectually prevents leakage.

In Figs. 5 and 6, a slight modification is shown in which each unit of the flexible hose consists of three parts 11, 12 and 13 which are secured together and which may be castings. The parts 11 and 12 are threaded for convenience in securing them together and each is provided with flattened walls 14 and 15 so that they may be gripped with wrenches. The curved portion for the joint between two members is formed half in the part 12 and half in the part 13 and these parts have threaded engagement as shown. The part 13 is provided with integral projections 16 so that it may be gripped with a wrench in securing the parts together. In assembling the hose, the end of the part 11 with the gasket thereon is inserted in the enlarged end of a part 12 and a part 13 is then passed over the part 11 and screwed up on the part 12 until it engages the gasket firmly. As in the construction above described, the gasket consists of three parts, a compressible part, as of asbestos, vulcabeston, or other similar material, and on either side thereof, a non-compressible ring. Also, in this construction, the pressure on the inner ring of the gasket tends to force it in a direction to expand the compressible gasket to more completely fill the space between the adjacent parts and thus more effectually prevent leakage.

Having described my invention, what I claim as new therein and desire to secure by Letters Patent of the United States is:

1. A joint consisting of two tubular metallic members interlocked to prevent separation thereof, one having one end thereof convexly curved, said end being formed in two parts, which are detachably secured together, two shoulders formed on the end of the other member, a gasket on said second member lying between and positioned by said shoulders, said gasket consisting of a ring of compressible material and a metallic ring on either side thereof, said metallic rings being movable with said gasket and said gasket being adapted to slide upon the interior surface of said convexly curved portion, substantially as set forth.

2. A joint consisting of two tubular metallic members interlocked to prevent separation thereof, one having one end thereof convexly curved, two shoulders formed on the end of the other member, and a gasket on said second member lying between and positioned by said shoulders, said gasket consisting of a ring of compressible material and a metallic ring on each side thereof, said metallic rings being movable with said gasket and said gasket being adapted to slide upon the interior surface of said convexly curved portion, substantially as set forth.

This specification signed and witnessed this 27th day of April, 1908.

EDWIN T. GREENFIELD.

Witnesses:
D. S. EDMONDS,
I. BARTLETT.